United States Patent
Liu et al.

(10) Patent No.: US 11,411,797 B2
(45) Date of Patent: Aug. 9, 2022

(54) DEVICE MANAGEMENT METHOD AND RELATED DEVICE

(71) Applicant: Huawei Technologies Co., Ltd., Shenzhen (CN)

(72) Inventors: Pinping Liu, Nanjing (CN); Yanfei Ye, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 16/415,553

(22) Filed: May 17, 2019

(65) Prior Publication Data

US 2019/0356531 A1    Nov. 21, 2019

(30) Foreign Application Priority Data

May 18, 2018  (CN) .......................... 201810481644.5

(51) Int. Cl.
*H04L 41/0213* (2022.01)
*G06F 9/455* (2018.01)
(Continued)

(52) U.S. Cl.
CPC ...... *H04L 41/0213* (2013.01); *G06F 9/45558* (2013.01); *H04L 41/0806* (2013.01);
(Continued)

(58) Field of Classification Search
CPC ............ H04L 41/0213; H04L 43/0817; H04L 41/0813; H04L 41/0226; H04L 41/04;
(Continued)

(56) References Cited

U.S. PATENT DOCUMENTS

| | | | |
|---|---|---|---|
| 6,480,901 B1 * | 11/2002 | Weber ................ | H04L 41/0213 709/223 |
| 6,836,796 B2 * | 12/2004 | Schwartz ............ | H04L 12/2803 709/217 |

(Continued)

FOREIGN PATENT DOCUMENTS

| | | |
|---|---|---|
| CN | 104702441 A | 6/2015 |
| CN | 106161385 A | 11/2016 |
| CN | 107659606 A | 2/2018 |

OTHER PUBLICATIONS

Hardaker, W., "Transport Layer Security (TLS) Transport Model for the Simple Network Management Protocol (SNMP)" RFC6353, Jul. 2011, 65 pages.

(Continued)

*Primary Examiner* — Kevin T Bates
*Assistant Examiner* — Ranjan Pant
(74) *Attorney, Agent, or Firm* — Conley Rose, P.C.

(57) ABSTRACT

A first control device obtains status indications of managed devices by using a first management protocol; the first control device stores the status indications and original device identifiers, of the managed devices, corresponding to the status indications; the first control device receives a request message sent by a second control device by using a second management protocol; the first control device extracts a status indication, where the extracted status indication is a status indication of a managed device identified by a virtual device identifier in the request message; and the first control device sends the extracted status indication to the second control device by using the second management protocol. The second control device manages the managed devices via the first control device.

20 Claims, 7 Drawing Sheets

(51) Int. Cl.
*H04L 41/0806* (2022.01)
*H04L 43/0817* (2022.01)
*H04L 61/5014* (2022.01)

(52) U.S. Cl.
CPC ...... *H04L 43/0817* (2013.01); *H04L 61/2015* (2013.01); *G06F 2009/45595* (2013.01)

(58) Field of Classification Search
CPC .............. H04L 41/0803; H04L 41/0806; H04L 61/2015; G06F 9/45558; G06F 2009/45595
See application file for complete search history.

(56) References Cited

U.S. PATENT DOCUMENTS

| | | | | |
|---|---|---|---|---|
| 2004/0123159 | A1* | 6/2004 | Kerstens | H04L 63/08 726/12 |
| 2006/0026301 | A1* | 2/2006 | Maeda | H04L 67/2823 709/246 |
| 2009/0141694 | A1* | 6/2009 | Shi | H04W 24/02 370/338 |
| 2010/0287270 | A1* | 11/2010 | Hashimoto | H04L 12/6418 709/223 |
| 2010/0325719 | A1* | 12/2010 | Etchegoyen | H04L 41/0663 726/15 |
| 2012/0265862 | A1* | 10/2012 | Fang | H04L 41/00 709/220 |
| 2014/0149592 | A1* | 5/2014 | Krishna | H04L 67/025 709/226 |
| 2015/0200964 | A1* | 7/2015 | Kariman | H04L 63/10 726/3 |
| 2015/0227381 | A1* | 8/2015 | Botzer | G06F 9/45558 718/1 |
| 2018/0034888 | A1 | 2/2018 | Cohen et al. | |

OTHER PUBLICATIONS

Foreign Communication From A Counterpad Application, European Application No. 19175035.5, Extended European Search Report dated Sep. 27, 2019, 9 pages.

* cited by examiner

| Status indications of managed devices | | | | | |
|---|---|---|---|---|---|
| Name | | | IP + port number | | |
| Type | | | Status | | All |

| Status | Name | IP + port number | Model | ... |
|---|---|---|---|---|
| Online | SW1 | 10.1.1.1: 1000 | MA5680T | ... |
| Status | Name | 10.1.1.1: 1001 | MA5600T | ... |

Next page

FIG. 4

DEVICE MANAGEMENT METHOD AND RELATED DEVICE

CROSS-REFERENCE TO RELATED APPLICATIONS

This application claims priority to Chinese Patent App. No. 201810481644.5 filed on May 18, 2018, which is incorporated by reference.

TECHNICAL FIELD

This application relates to the field of communications technologies, and in particular, to a device management method and a related device.

BACKGROUND

As data center technologies are emerging, network devices are gradually all deployed in a data center, and networking scenarios in which a network manager and network devices are in different networks are gradually becoming popular. However, the network manager cannot cross a network to manage the network devices in the data center. Particularly, when a user expects to use a conventional network manager as a main management interface, it is impossible for the network manager to use the Simple Network Management Protocol (SNMP) to manage the network devices in the data center.

SUMMARY

This application provides a device management method and a related device, to allow an existing network manager to manage network devices in a data center.

According to one aspect, this application provides a device management method. In this method, a first control device obtains status indications of managed devices by using a first management protocol, and the first control device may store the status indications and original device identifiers, of the managed devices, corresponding to the status indications into a database, where the status indications and the original device identifiers are in a one-to-one correspondence; the first control device extracts a status indication from the database when receiving a request message sent by a second control device by using a second management protocol, where the extracted status indication is a status indication of a managed device identified by a virtual device identifier in the request message, and the virtual device identifier of the managed device is corresponding to the original device identifier of the managed device; and the first control device sends the extracted status indication to the second control device by using the second management protocol.

The first control device simulates a managed device that is managed by the second control device to send a status indication of the managed device to the second control device. Therefore, the second control device is allowed to manage the managed device by using the second management protocol, for example, the Simple Network Management Protocol, without hardware or software of the second control device modified to make the second control device support the first management protocol, while the first control device manages the managed device by using the first management protocol.

For example, the second control device is a network manager, and the second management protocol is the Simple Network Management Protocol SNMP. According to embodiments of this application, the network manager can still use the SNMP to manage managed devices in a data center without any modification to the network manager, thereby avoiding massive software or hardware upgrading required for the network manager to adapt to the first management protocol.

The first management protocol may be the Network Configuration NETCONF protocol, the sTelnet protocol, or other protocols that can manage managed devices in a data center. This is not limited in this application.

The original device identifier is a device identifier of the managed device when the first control device communicates with the managed device. For example, the original device identifier is an actual IP address and/or a port number of the managed device, or a public network IP address obtained after network address translation (NAT) and/or a port number of the managed device. This is not limited in this application.

The virtual device identifier is a device identifier of the managed device when the first control device communicates with the second control device. For example, the virtual device identifier is a combination of an IP address and a port number of the first control device. Virtual device identifiers of different managed devices may include different IP addresses of the first control device, or virtual device identifiers of different managed devices may include different port numbers. This is not limited in this application.

In a possible implementation, the first control device stores a correspondence between an original device identifier and a virtual device identifier of each managed device. For example, the first control device determines the virtual device identifiers of the managed devices, and the first control device stores a correspondence between the original device identifiers and the virtual device identifiers of the managed devices. In this way, the first control device can process, based on this correspondence, a message with which the second control device uses a virtual device identifier to communicate with a managed device.

In a possible implementation, the first control device may determine the virtual device identifiers of the managed devices through static or dynamic configuration, to ensure, in brief, that different managed devices are corresponding to different virtual device identifiers.

Correspondingly, the first control device may send the virtual device identifiers of the managed devices to the second control device by using the second management protocol. For example, the first control device sends the virtual device identifier of each managed device to the second control device by using the SNMP protocol in a form of an alarm message, where the alarm message may be an SNMP trap with which the first control device sends a message to the second control device actively rather than waiting for another round of polling of the second control device. This helps the second control device learn of an added managed device and a virtual device identifier of the added managed device in time.

In another possible implementation, the alarm message may be further used for the first control device to send a status indication of the managed device to the second control device. The status indication sent by using an alarm message may be preset, and sent to the first control device by the managed device upon automatic triggering, and then sent to the second control device. For example, when a preset status indication is present on a managed device, the managed device sends an alarm message to the first control device, where the alarm message may carry the status indication of the managed device, and the like. The first control device determines that the alarm message is intended to be sent to the second control device, and a virtual device identifier of the managed device sends the alarm message to the second control device.

In another possible implementation, if the second control device needs to instruct the managed device to configure a related configuration parameter, it may be implemented by using the following steps. The first control device receives a configuration parameter, sent by the second control device by using the second management protocol, corresponding to the virtual device identifier of the managed device, and the first control device instructs, by using the first management protocol, the managed device identified by the original device identifier corresponding to the virtual device identifier to configure the configuration parameter.

In a possible implementation, the first control device may store the received configuration parameter and the virtual device identifier corresponding to the configuration parameter into a database. After an original device identifier corresponding to the virtual device identifier is determined, the configuration parameter corresponding to the virtual device identifier may be read from the database to instruct the managed device identified by the original device identifier to configure the configuration parameter.

It can be learned that in this implementation, the second control device can configure a configuration parameter of a managed device in a data center, so as to manage the managed device.

In a possible implementation, the first control device may further obtain an operation result obtained after the managed device performs an operation indicated by the configuration parameter or an updated status indication after the configuration parameter is configured. For example, the configuration parameter is "shutdown". Then, a related operation result may be that the managed device is shut down. After obtaining the operation result or a status indication that the managed device is shut down, the first control device may send the operation result or the status indication that the managed device is shut down to the second control device, so that the second control device displays on a display screen that the managed device is in a shutdown status.

According to another aspect, this application further provides a device management method. The device management method is described by using a second control device as an execution body. The device management method may include: sending, by the second control device by using a second management protocol and a virtual device identifier, a request message; receiving a status indication, of a managed device, corresponding to the virtual device identifier, where the status indication is returned by a first control device in response to the request message; and outputting the status indication, of the managed device, corresponding to the virtual device identifier.

It can be learned that in this implementation, the first control device simulates a managed device that is managed by the second control device to send a status indication of the managed device to the second control device. Therefore, the second control device is allowed to manage the managed device by using a second management protocol, for example, the Simple Network Management Protocol, without hardware or software of the second control device modified to make the second control device support a first management protocol, while the first control device manages the managed device by using the first management protocol.

In a possible implementation, the second control device may receive a virtual device identifier of each managed device that is sent by the first control device, and therefore manage the managed device based on the virtual device identifier and a second management protocol.

In a possible implementation, the device management method may further include: in a process in which the second control device instructs, by using the second management protocol and a virtual device identifier, a managed device corresponding to the virtual device identifier to configure a configuration parameter, because the first control device has stored correspondences between virtual device identifiers and original device identifiers in advance, the first control device may receive the configuration parameter and query for an original device identifier corresponding to the virtual device identifier, so that the first control device can instruct, based on the original device identifier and a first management protocol, a corresponding managed device to configure the configuration parameter. It can be learned that in this implementation, the second control device can instruct the managed device to configure the configuration parameter by using the second management protocol while software or hardware upgrading for the second control device to adapt to the first management protocol is avoided.

Correspondingly, the second control device may further use the virtual device identifier and the second management protocol to query for an operation result or an updated status indication obtained after the managed device executes the configuration parameter, and output the operation result or the updated status indication.

According to still another aspect, this application further provides a device, and the device may include: an obtaining unit configured to obtain status indications of managed devices by using a first management protocol; a storage unit configured to store the status indications and original device identifiers, of the managed devices, corresponding to the status indications into a database, where the status indications and the original device identifiers are in a one-to-one correspondence; a receiving unit configured to receive a request message sent by a second control device by using a second management protocol; a query unit configured to extract a status indication from the database, where the extracted status indication is a status indication of a managed device identified by a virtual device identifier in the request message, where the virtual device identifier of the managed device is corresponding to the original device identifier of the managed device; and a sending unit configured to send the extracted status indication to the second control device by using the second management protocol.

In a possible implementation, a determining unit is configured to determine virtual device identifiers of the managed devices; and the storage unit is further configured to store a correspondence between the original device identifiers and the virtual device identifiers of the managed devices.

In a possible implementation, the sending unit is further configured to send the virtual device identifiers of the managed devices to the second control device by using the second management protocol.

In a possible implementation, the virtual device identifier includes a combination of an IP address and a transport layer port number corresponding to the managed device that are of the first control device.

In a possible implementation, the receiving unit is further configured to receive a configuration parameter, sent by the second control device, corresponding to the virtual device identifier of the managed device, and the device further includes: an instruction unit configured to instruct, by using the first management protocol, the managed device identified by the original device identifier corresponding to the virtual device identifier to configure the configuration parameter.

The possible designs of the device in this aspect have the same effects as the possible execution steps corresponding to the first control device in the device management methods in the foregoing aspects. Details are not described herein again.

According to still another aspect, this application further provides a device, and the device includes: a processor, a communications interface, and a memory, where the processor is configured to use the communications interface to obtain status indications of managed devices by using a first management protocol; the processor is further configured to store the status indications and original device identifiers, of the managed devices, corresponding to the status indications into a database in the memory, where the status indications and the original device identifiers are in a one-to-one correspondence; the processor is further configured to use the communications interface to receive a request message sent by a second control device by using a second management protocol; the processor is further configured to extract a status indication from the database, where the extracted status indication is a status indication of a managed device identified by a virtual device identifier in the request message, and the virtual device identifier of the managed device is corresponding to the original device identifier of the managed device; and the processor is further configured to use the communications interface to send the extracted status indication to the second control device by using the second management protocol.

According to still another aspect, this application further provides a device, including: a memory, a processor, and a program that is stored in the memory and that is capable of running on the processor, where the processor executes the program to implement the operations of the first control device in the device management methods in the foregoing aspects. It should be noted that the memory may be a non-volatile memory, or may be a volatile memory. The memory may be located inside the communications device, or may be located outside the communications device.

According to still another aspect, this application further provides a communications device, and the communications device may use the related steps of the first control device in the device management methods in the foregoing aspects. The communications device may be a terminal, or may be hardware implementing a similar function.

According to still another aspect, this application further provides a communications device, including at least one processor. The processor is coupled to the memory, and the processor is configured to read an instruction in the memory and execute, according to the instruction, the operations of the first control device in the methods in the foregoing aspects.

According to still another aspect, this application further provides a computer readable storage medium, where the computer readable storage medium stores an instruction, and when the instruction is executed, the operations of the first control device in the methods in the foregoing aspects are performed.

BRIEF DESCRIPTION OF DRAWINGS

FIG. 4 is a schematic diagram of a status indication display interface of a second control device according to an embodiment of this application;

DESCRIPTION OF EMBODIMENTS

Figure 1:
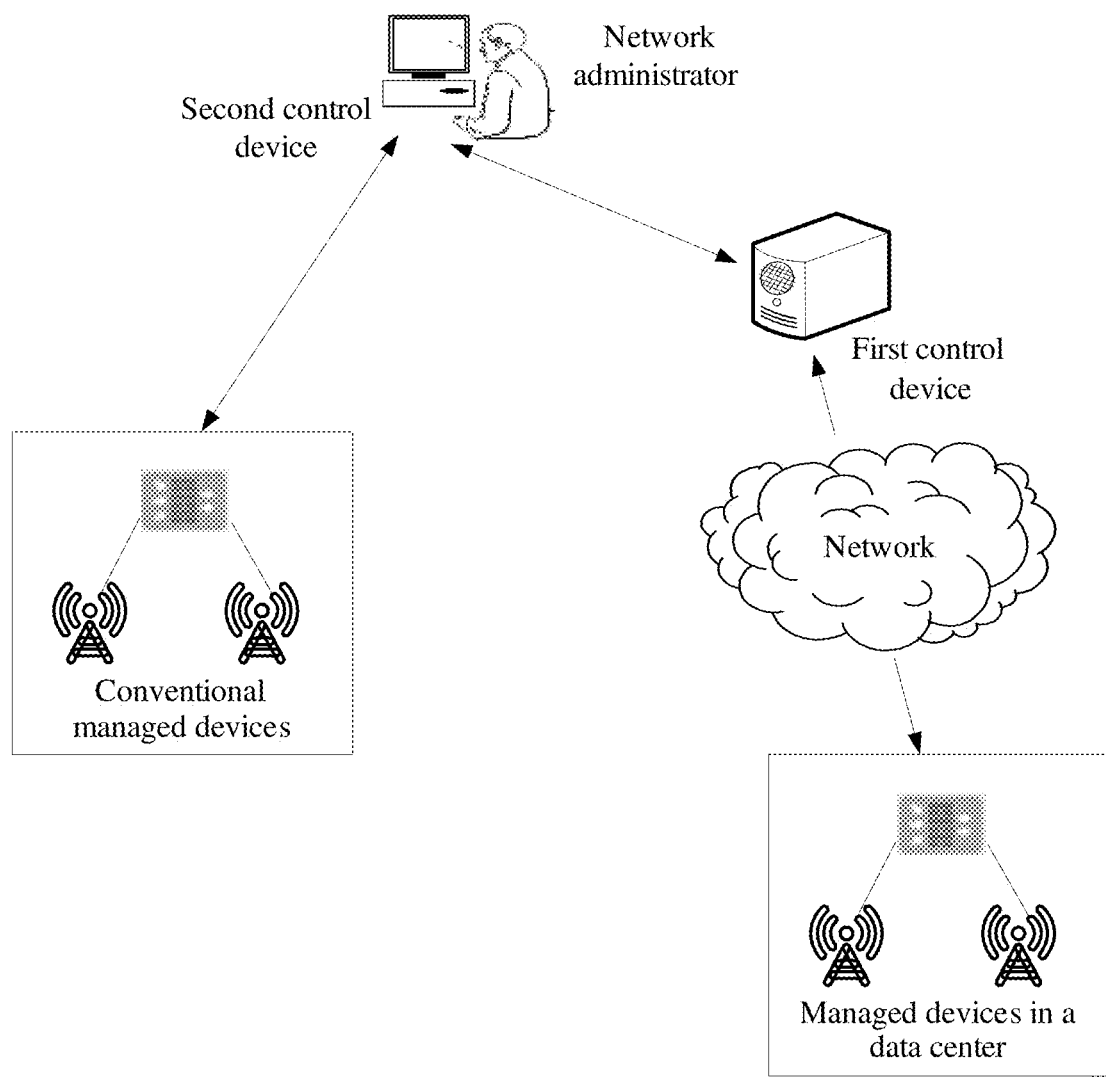
FIG. 1 is a schematic structural diagram of a device management system according to an embodiment of this application.

Embodiments of this application provide a device management method. In this method, a first control device simulates a managed device that is managed by a second control device to send a status indication of the managed device to the second control device. This allows the second control device to manage the managed device by using a second management protocol, for example, the Simple Network Management Protocol, without hardware or software of the second control device modified to make the second control device support a first management protocol, while the first control device manages the managed device by using the first management protocol.

In the embodiments of this application, a managed device can use the NETCONF or the sTelnet protocol to register with the first control device. The NETCONF protocol or the sTelnet protocol is an improvement of the SNMP protocol. The NETCONF protocol or the sTelnet protocol is based on the Transmission Control Protocol (TCP) but more reliable. NETCONF or sTelnet supports active registration of devices and is a protocol that allows cross-network management of the first control device on managed devices. Conventional managed devices and managed devices in a data center may all include a firewall device, a network switch device, a wireless access point (AP) device, and the like.

In the embodiments of this application, the first control device may be a controller that manages managed devices by using the NETCONF protocol or the sTelnet protocol.

In the embodiments of this application, the second control device may be at least one or more devices deployed with a network management system (NMS). This network management system generally has functions such as alarming, configuration, and status display.

In the embodiment of this application, the first management protocol may be the Network Configuration NETCONF protocol, the sTelnet protocol, or the like, and can be used to manage managed devices in a data center. The second management protocol may be the SNMP.

In the embodiments of this application, an original device identifier is a device identifier of a managed device when the first control device communicates with the managed device. For example, the original device identifier is an actual Internet Protocol (IP) address and/or a port number of the managed device, or an IP address of the managed device that is obtained after NAT, or a combination of an after-NAT IP address and a port number. Optionally, the original device identifier may alternatively be a Uniform Resource Name (URN) based on the NETCONF protocol. The first control device may use a URN of a managed device to communicate with the managed device. A virtual device identifier is a device identifier of a managed device when the first control device communicates with the second control device. For example, the virtual device identifier is a combination of an IP address and a port number of the first control device. When virtual device identifiers are combinations of one IP address and different port numbers, different managed devices are corresponding to different port numbers.

For detailed descriptions, a schematic structural diagram of a device management system is provided according to an embodiment of this application. As shown in FIG. 1, in the device management system, a computer equipped with a display is used as an example of a second control device, and an NMS is deployed on the computer. The second control device, for example, a server, can manage managed devices based on a first management protocol. Managed devices may be classified into the foregoing managed devices in a data center and conventional managed devices, as shown in FIG. 1. Devices in both categories may include a network switch device and a wireless AP device, but use different management protocols. A first control device manages the managed devices in the data center by using a first management protocol, and the second control device manages the conventional managed devices by using a second management protocol.

It can be learned from the foregoing that the first control device may manage the managed devices by using the NETCONF protocol or the sTelnet protocol. In this embodiment of this application, a reason why the first control device is not used to replace the second control device is: As shown in FIG. 1, there are many conventional managed devices in a network, these managed devices interact with the second control device by using the SNMP, and if the NETCONF protocol is used to manage the conventional managed devices, a great amount of software or hardware update is required for the conventional managed devices, while massive device update is difficult and quite costly.

Therefore, in this embodiment of this application, the NETCONF protocol or the sTelnet protocol is used between the first control device and managed devices in a newly-deployed data center, and indirect management is established between the second control device and the managed devices via the first control device. Therefore, when continuing with management on the conventional network devices, the second control device can also indirectly manage the managed devices in the data center, thereby avoiding massive device update. In another aspect, currently, managed devices in a newly-established data center are mostly entrusted to management by a third party, and the managed devices in the data center are managed by using the first management protocol of the first control device. However, if an entrusting party wants to view or also manage these managed devices in real time, software or hardware of a second control device of the entrusting party needs to be upgraded to support the first management protocol, so as to view or manage the managed devices in real time. As a result, costs for software or hardware upgrading of the second control device are relatively high. Therefore, to make the second control device able to view or also manage these managed devices in real time while avoiding software or hardware upgrading of the second control device, the device management method is provided in the embodiments of this application. With this method, a second control device can manage managed devices in a data center indirectly via a first control device while the first control device manages the managed devices by using the first management protocol, and a habit of the entrusting party in using the SNMP management interface is retained. This helps smooth evolution of a device management manner to a data center centralized management manner.

As shown in FIG. 1, in an embodiment of this application, the second control device can still manage the conventional managed devices by using the SNMP. For the managed devices in the data center, the second control device uses the device management method in the embodiments of this application to manage the managed devices indirectly via the first control device. For example, the SNMP protocol may be used between the second control device and the first control device, and the NETCONF protocol may be used between the first control device and the managed device.

To describe this application in detail, the following several implementations are provided in the embodiments of this application to implement management on managed devices in a data center.

Figure 2:
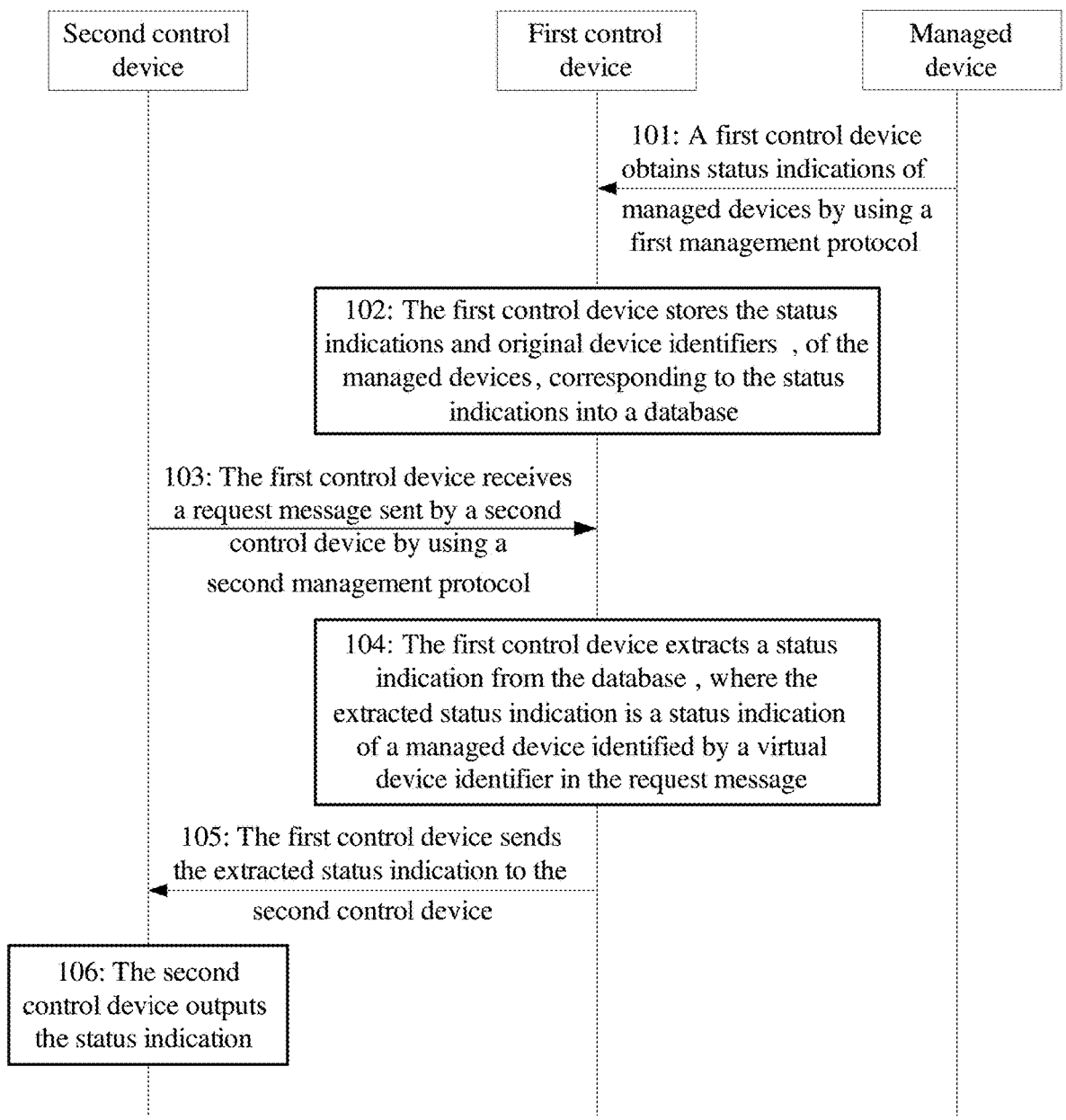
FIG. 2 is a schematic flowchart of a device management method according to an embodiment of this application.

FIG. 2 is a schematic flowchart of a device management method according to an embodiment of this application. As shown in FIG. 2, the device management method may include the following steps.

101: A first control device obtains status indications of managed devices by using a first management protocol.

For example, the status indication may include a CPU, a memory usage rate, and the like of the managed device.

102: The first control device stores the status indications and original device identifiers, of the managed devices, corresponding to the status indications into a database.

The status indications and the original device identifiers are in a one-to-one correspondence.

103: The first control device receives a request message sent by a second control device by using a second management protocol.

A device identifier in a packet header of the request message is a virtual device identifier of a managed device.

104: The first control device extracts a status indication from the database, where the extracted status indication is a status indication of a managed device identified by a virtual device identifier in the request message.

The virtual device identifier of the managed device is corresponding to the original device identifier of the managed device. Therefore, in an optional implementation, that the first control device extracts a status indication from the database includes: the first control device determines an original device identifier corresponding to the virtual device identifier in the request message; and the first control device extracts a status indication of a managed device identified by the original device identifier from the database.

105: The first control device sends the extracted status indication to the second control device by using the second management protocol.

106: The second control device outputs the status indication.

In an example, the second management protocol is the SNMP. That is, when the first control device interacts with the second control device by using the SNMP protocol, the first control device may act as an SNMP server, and the second control device may act as an SNMP client to access the first control device. Correspondingly, in this example, a packet format of the request message may be an SNMP packet format, and the request message further carries a virtual device identifier.

It can be learned that in this implementation, the second control device can manage a managed device via the first control device without any modification. Correspondingly, the second control device can manage conventional managed devices by still using a second management protocol. This avoids software or hardware upgrading required for the network manager to adapt to a first management protocol, and helps evolution from conventional distributed networks to densely deployed networks.

Figure 3:
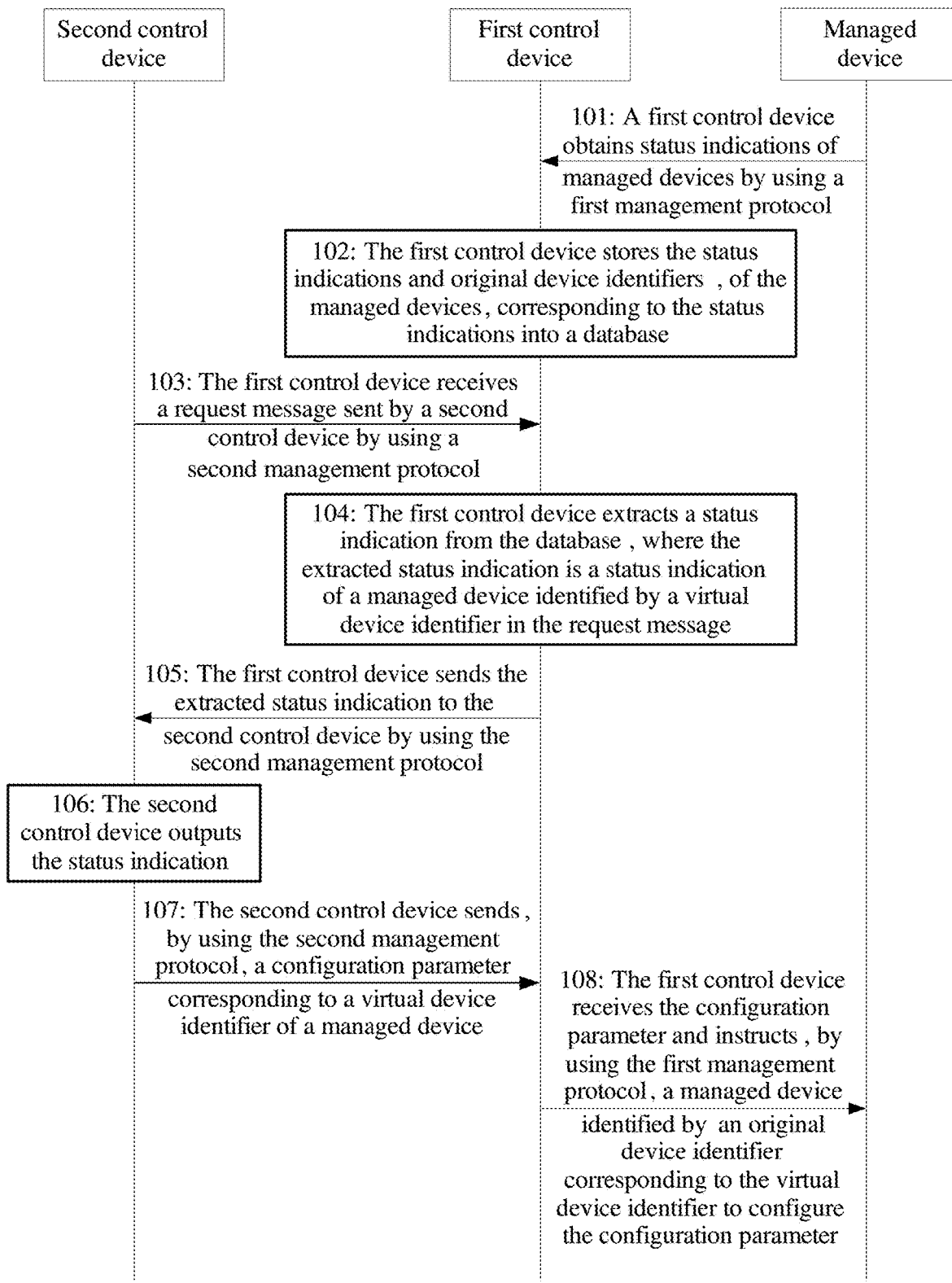
FIG. 3 is a schematic flowchart of another device management method according to an embodiment of this application.

FIG. 3 is a schematic flowchart of another device management method according to an embodiment of this application. A difference between the device management method shown in FIG. 3 and the device management method shown in FIG. 2 lies in that, in the device management method shown in FIG. 3, the second control device may further instruct, via the first control device, a managed device to configure a configuration parameter. Specifically, the device management method may include the following steps.

107: The second control device sends, by using the second management protocol, a configuration parameter corresponding to a virtual device identifier of a managed device.

108: The first control device receives the configuration parameter and instructs, by using the first management protocol, a managed device identified by an original device identifier corresponding to the virtual device identifier to configure the configuration parameter.

Correspondingly, in an example, step 106 to step 107 may be specifically: When the second control device uses a packet of the second management protocol to send the configuration message, a destination address in the packet of the second management protocol is the virtual device identifier; and correspondingly, when receiving the packet of the second management protocol, the first control device may read the configuration parameter and encapsulate the configuration parameter into a packet of the first management protocol, query for an original device identifier corresponding to the virtual device identifier based on a correspondence, use the original device identifier as a destination address of the packet of the first management protocol, and sends the packet of the first management protocol to a corresponding managed device, so that the managed device executes or configures the configuration parameter in the packet of the first management protocol.

In another example, unlike the foregoing example, when receiving the packet of the second management protocol, the first control device may store the virtual device identifier and the configuration parameter in the packet into the database in correspondence. When there is a need to instruct the managed device to configure the configuration parameter, the first control device may read, from the database, the configuration parameter of the managed device, encapsulate the configuration parameter into a packet of the first management protocol, and send the packet to the managed device.

In an example, the first management protocol is NETCONF, and the second management protocol is the SNMP. Then, an information carrying format of the configuration parameter in the packet of the first management protocol is a YANG file format, where the YANG file is a data modeling language and a data model that are used by the NETCONF protocol. An information carrying format of the configuration parameter in the packet of the second management protocol is a management information base (MIB) format. Therefore, the first control device may convert a configuration parameter in the format of a MIB file to a configuration parameter in the format of a YANG file based on a MIB-YANG mapping table.

In a possible implementation, the device management method may further include: the first control device obtains a status indication after the managed device executes or configures the configuration parameter, and sends the status indication to the second control device, where the status indication is output by the second control device.

For example, the configuration parameter is "shutdown". Then, the managed device may perform a shutdown operation corresponding to the "shutdown" parameter, and the second control device changes the status indication of the managed device, for example, from an active state to a shutdown state.

It can be learned that in the device management method shown in FIG. 3, the second control device can further instruct, via the first control device, the managed device to configure the configuration parameter, to help the second control device manage the managed device.

In a possible implementation, the device management method shown in FIG. 2 and FIG. 3 may further include establishing the foregoing correspondence. Specifically, the establishing the correspondence may include the following steps: the first control device determines a virtual device identifier of each managed device; and the first control device stores a correspondence between an original device identifier and the virtual device identifier of each managed device. Correspondingly, the first control device may send the virtual device identifiers of the managed devices to the second control device by using the second management protocol.

It can be learned that in this implementation, the first control device can update a correspondence of a managed device in time, for example, an original device identifier and a virtual device identifier of a newly-added managed device in the data center.

In the embodiments of this application, the first control device may store a correspondence between the status indications of the managed devices and the original device identifiers of the managed devices, or store a correspondence between the status indications of the managed devices and the virtual device identifiers of the managed devices. Correspondingly, the first control device stores a correspondence between the original device identifiers and the virtual device identifiers of the managed devices, so that the first control device may extract a corresponding status indication from the database based on a virtual device identifier in a request message or a configuration parameter.

In another implementation, the first control device may store a correspondence between other device identifiers of the managed device, for example, media access control (MAC) addresses or electronic serial numbers (ESNs) of the managed devices, and the status indications of the managed devices. Correspondingly, the first control device may further store a correspondence between the other device identifiers of the managed devices and the original device identifiers of the managed device and a correspondence between the other device identifiers of the managed devices and the virtual device identifiers of the managed devices, so that the first control device can extract a corresponding status indication from the database based on a virtual device identifier in a request message or a configuration parameter.

In an optional implementation, that the first control device may send the virtual device identifiers of the managed devices to the second control device by using the second management protocol may be specifically: The first control device sends a virtual device identifier of each managed device to the second control device by using the SNMP protocol in an alarm message, where the alarm message may be an SNMP trap with which the first control device sends a message to the second control device actively rather than waiting for another round of polling of the second control device. This helps the second control device learn of an added managed device and a virtual device identifier of the added managed device in time.

In another possible implementation, the alarm message may be further used for the first control device to send a status indication of the managed device to the second control device. The status indication sent by using an alarm message may be preset, and sent to the first control device by the managed device upon automatic triggering, and then sent to the second control device. For example, when a preset status indication is present on a managed device, the managed device sends an alarm message to the first control device, where the alarm message may carry the status indication of the managed device, and the like. The first control device determines that the alarm message is intended to be sent to the second control device, and a virtual device identifier of the managed device sends the alarm message to the second control device.

In an example, the second control device outputs the status indication of the managed device. FIG. 4 is a schematic diagram of a status display interface of a second control device according to an embodiment of this application. As shown in FIG. 4, the status display interface of the second control device can display information such as a name, status information, a virtual device identifier (for example an IP address+a port number), and a model of the managed device. This helps a user directly view, on a conventional NMS management interface, status indications of managed devices in a data center, avoiding software or hardware upgrading required for the second control device to adapt to a first management protocol. The status display interface shown in FIG. 4 is a simple example, and the status display interface may further include other information. This is not limited in this application.

Figure 5:
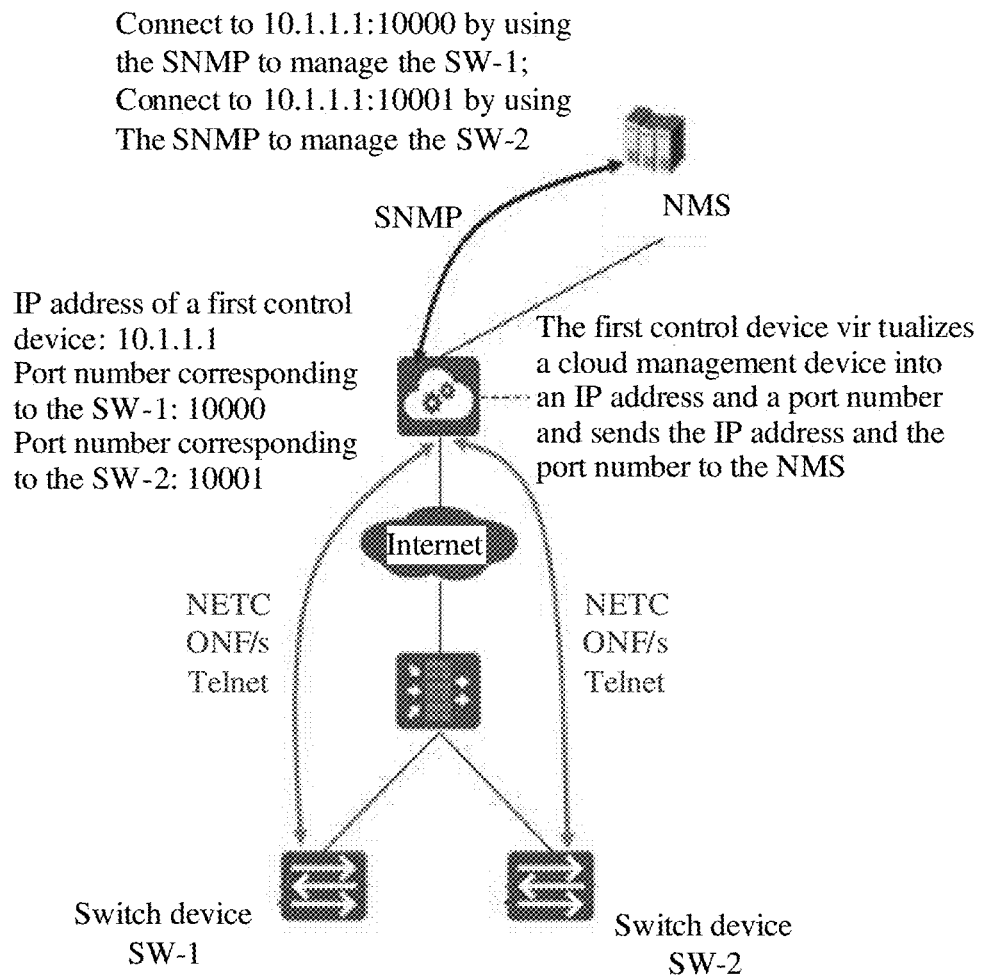
FIG. 5 is a schematic diagram of a device management method according to an embodiment of this application.

In an example, FIG. 5 is a schematic diagram of a device management method according to an embodiment of this application. As shown in FIG. 5, managed devices are a switch device SW-1 and a switch device SW-2. A virtual device identifier corresponding to the switch device SW-1 is an IP address 10.1.1.1 and a port number 10000 of a first control device. A virtual device identifier corresponding to the switch device SW-2 is an IP address 10.1.1.1 and a port number 10001 of the first control device. The first control device may also be referred to as a controller. The controller notifies the virtual device identifiers of the network elements (the switch device SW-1 and the switch device SW-2) to an NMS, and the controller may also establish connections to the switch devices by using NETCONF or sTelnet. The NMS connects to 10.1.1.1:10000 by using the SNMP to manage the SW-1, and the NMS connects to 10.1.1.1:10001 by using the SNMP to manage the SW-2.

Figure 6:
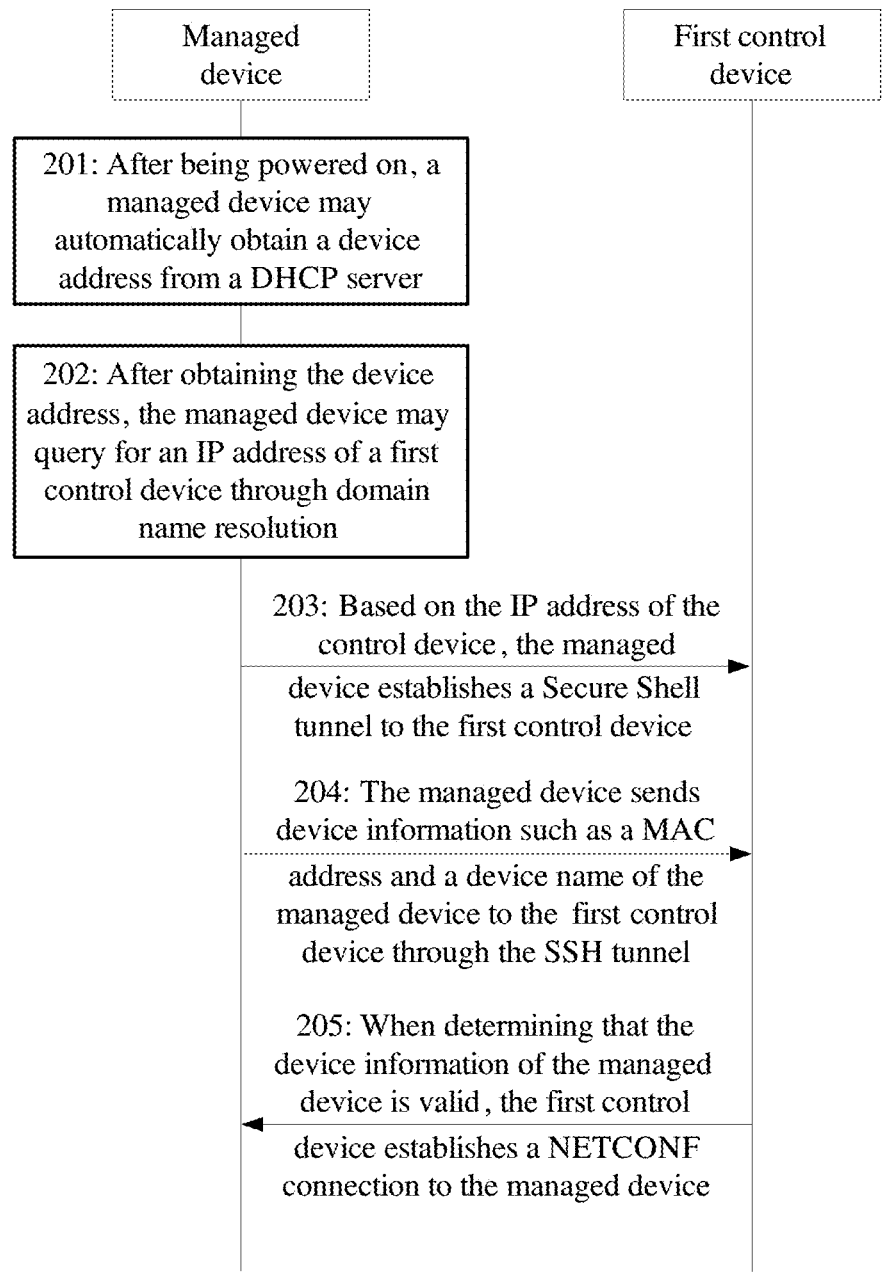
FIG. 6 is a schematic flowchart of registration of a managed device with a first control device according to an embodiment of this application.

In a possible implementation, the device management method in FIG. 2 and FIG. 3 may further include: the first control device establishes a NETCONF connection to the managed device, to manage the managed device. Specifically, FIG. 6 is a schematic flowchart of registration of a managed device with a first control device according to an embodiment of this application. The first control device and the managed device may implement interactive operations shown in FIG. 6.

As shown in FIG. 6, the interactive operations between the first control device and the managed device include the following steps.

201: After being powered on, the managed device may automatically obtain a device address from a DHCP server.

DHCP stands for Dynamic Host Configuration Protocol (DHCP), a network protocol for local area networks.

202: After obtaining the device address, the managed device may query for an IP address of the first control device through domain name resolution.

It can be learned that the managed device may obtain the IP address of the first control device through domain name resolution. Domain name resolution is a process of translation from a domain name to an IP address.

203: Based on the IP address of the first control device, the managed device establishes a Secure Shell (SSH) tunnel to the first control device.

204: The managed device sends device information such as a MAC address and a device name of the managed device to the control device through the SSH tunnel.

205: When determining that the device information of the managed device is valid, the first control device establishes a NETCONF connection to the managed device.

The first control device may determine whether the device information of the managed device is valid, by checking whether the managed device is in a white list of the control device. If the managed device is in the white list of the control device, the first control device continues to check whether an identity certificate of the managed device is valid. If the identity certificate of the managed device is valid, the first control device performs step 205, and management on the managed device by the first control device is this implemented.

In this embodiment of this application, the process from 201 to 205 may also be referred to as a process of registration of the managed device with the first control device, so that the control device can manage the managed device.

In conclusion, in the embodiments of this application, the first control device simulates a managed device that is managed by the second control device to send a status indication of the managed device to the second control device. Therefore, the second control device is allowed to manage the managed device by using the second management protocol, for example, the Simple Network Management Protocol, without hardware or software of the second control device modified to make the second control device support the first management protocol, while the first control device manages the managed device by using the first management protocol. Therefore, the device management method in the embodiments of this application helps smooth evolution from an existing device management manner to a data center management or a cloud management manner.

Figure 7:
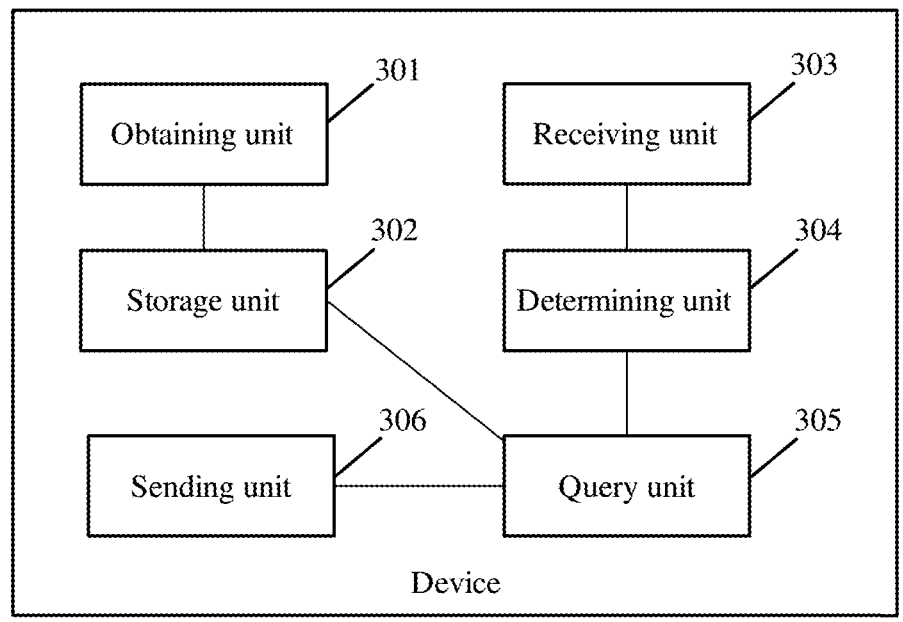
FIG. 7 is a schematic structural diagram of a device according to an embodiment of this application.

FIG. 7 is a schematic flowchart of a device according to an embodiment of this application. As shown in FIG. 7, the device may include the following units.

An obtaining unit 301 is configured to obtain status indications of managed devices by using a first management protocol.

A storage unit 302 is configured to store the status indications and original device identifiers, of the managed devices, corresponding to the status indications into a database, where the status indications and the original device identifiers are in a one-to-one correspondence.

A receiving unit 303 is configured to receive a request message sent by a second control device by using a second management protocol.

The operation performed by the obtaining unit 301 of obtaining status indications of a plurality of managed devices by using the first management protocol may alternatively be implemented through interaction between the receiving unit 303 and a sending unit 306.

A query unit 305 is configured to extract a status indication from the database, where the extracted status indication is a status indication of a managed device identified by a virtual device identifier in the request message.

The virtual device identifier of the managed device is corresponding to the original device identifier of the managed device. Therefore, in an optional implementation, that the query unit 305 extracts a status indication from the database is specifically: The query unit 305 determines an original device identifier of the managed device identified by the virtual device identifier in the request message, and the query unit 305 extracts a status indication corresponding to the original device identifier from the database. That the query unit 305 determines an original device identifier of the managed device identified by the virtual device identifier in the request message is that the query unit 305 determines an original device identifier corresponding to the virtual device identifier in the request message.

The sending unit 306 is configured to send the extracted status indication to the second control device by using the second management protocol.

In a possible implementation, the device further includes: a determining unit 304 configured to determine virtual device identifiers of the managed devices; and the storage unit 302 is further configured to store a correspondence between the original device identifiers and the virtual device identifiers of the managed devices.

In a possible implementation, the device further includes: the sending unit 306 is further configured to send the virtual device identifiers of the managed devices to the second control device by using the second management protocol.

In a possible implementation, the virtual device identifier includes a combination of an IP address and a transport layer port number corresponding to the managed device that are of the first control device.

In a possible implementation, the receiving unit 303 is further configured to receive a configuration parameter, sent by the second control device, corresponding to the virtual device identifier of the managed device. Correspondingly, the device further includes: the instruction unit 307, further configured to instruct, by using the first management protocol, the managed device identified by the original device identifier corresponding to the virtual device identifier to configure the configuration parameter.

Figure 8:
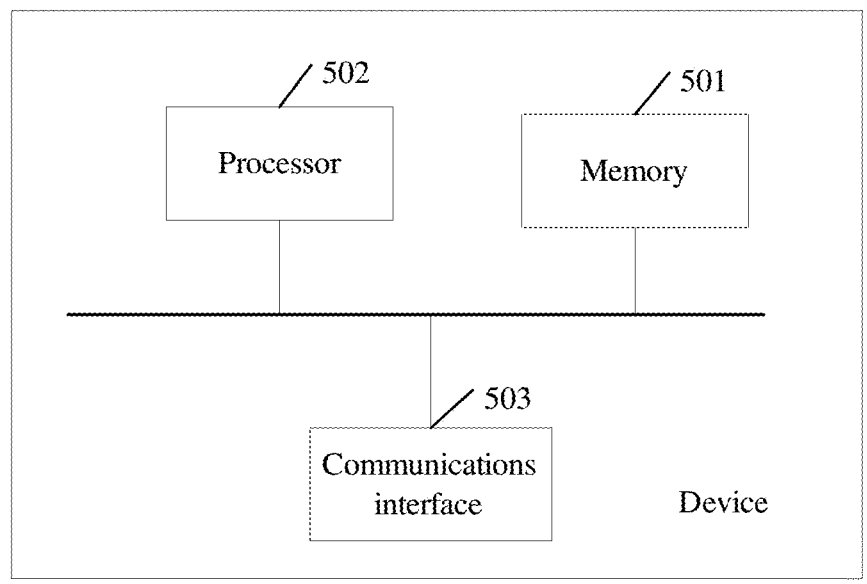
FIG. 8 is a schematic structural diagram of another device according to an embodiment of the present disclosure.

FIG. 8 is a schematic structural diagram of another device according to an embodiment of the present disclosure. As shown in FIG. 8, the device may include: a processor 402, a communications interface 403, and a memory 401. The communications interface 403, the processor 402, and the memory 401 are connected to each other. The processor 402 may implement functions of the foregoing output unit. The communications interface may have a function similar to that of the foregoing sending unit or receiving unit, and the memory may store status information or operation results received by the processor. In an example, the communications interface 403 may include a receiver and a transmitter, or may be a result of integration of a receiver and a transmitter. This is not limited in this application. Optionally, the device may further include a bus, and the bus may be a peripheral component interconnect (PCI) bus, an Extended Industry Standard Architecture (EISA) bus, or the like. The bus may be classified into an address bus, a data bus, a control bus, and the like. For ease of representation, only one bold line is used to represent the bus in FIG. 8, but this does not mean that there is only one bus or only one type of bus.

The processor 402 is configured to use the communications interface 403 to obtain status indications of managed devices by using a first management protocol.

The processor 402 is further configured to store the status indications and original device identifiers, of the managed devices, corresponding to the status indications into a database in the memory, where the status indications and the original device identifiers are in a one-to-one correspondence.

The processor 402 is further configured to use the communications interface 403 to receive a request message sent by a second control device by using a second management protocol.

The processor 402 is further configured to extract a status indication from the database, where the extracted status indication is a status indication of a managed device identified by a virtual device identifier in the request message.

The virtual device identifier of the managed device is corresponding to the original device identifier of the managed device.

The communications interface 403 is further configured to use the communications interface 403 to send the status indication obtained through query to the second control device by using the second management protocol.

The processor 402 is further configured to determine a virtual device identifier of each managed device in the plurality of managed devices.

The processor 402 is further configured to store a correspondence between the original device identifier and the virtual device identifier of each managed device in the plurality of managed devices.

The processor 402 is further configured to use the communications interface 403 to send the virtual device identifiers of the managed devices to the second control device by using the second management protocol.

In a possible implementation, the processor 402 is further configured to determine virtual device identifiers of the managed devices.

The processor 402 is further configured to store a correspondence between the original device identifiers and the virtual device identifiers of the managed devices into the memory 401.

In an optional implementation, the processor 402 is further configured to use the communications interface 403 to send the virtual device identifiers of the managed devices to the second control device by using the second management protocol.

In an optional implementation, the virtual device identifier includes a combination of an IP address and a transport layer port number corresponding to the managed device that are of the first control device.

In an optional implementation, the processor 402 is further configured to use the communications interface 403 to receive a configuration parameter, sent by the second control device by using the second management protocol, corresponding to the virtual device identifier of the managed device.

The processor 402 is further configured to instruct, by using the first management protocol, the managed device identified by the original device identifier corresponding to the virtual device identifier to configure the configuration parameter.

It should be understood that, in this application, units (the receiving unit, the sending unit, the output unit, and the like) or components (the communications interface, the processor, and the like) in the foregoing first control device can jointly perform steps or behavior of the first control device in some or whole embodiments of this application. This is not limited in this application.

In another implementation of this embodiment, a communications device is further provided. The communications device may use the related steps of the first control device in the device management method in the foregoing aspect. The communications device may be a terminal, or may be hardware implementing a similar function.

In another implementation of this embodiment, a communications device is further provided, including at least one processor. The processor is coupled to the memory, and the processor is configured to read an instruction in the memory and execute, according to the instruction, the operations of the first control device in the methods in the foregoing aspects.

In another implementation of this embodiment, a computer readable storage medium is provided. The computer readable storage medium stores an instruction, and when the instruction is executed, the function of the first control device in the device management method in the foregoing embodiments is performed.

It should be understood that in the embodiments of this application, the processor may be a central processing unit (CPU), or the processor may be another general-purpose processor, a digital signal processor (DSP), an application-specific integrated circuit (ASIC), a field-programmable gate array (FPGA) or other programmable logic devices, a discrete gate or transistor logic device, a discrete hardware component, or the like. The general-purpose processor may be a microprocessor, or the processor may be any conventional processor, or the like.

The memory may include a read-only memory and a random access memory, and provide an instruction and data to the processor. A part of the memory may further include a non-volatile random access memory.

In an implementation process, the steps in the foregoing method may be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software module. The software module may be located in a storage medium mature in the art, such as a random access memory, a flash memory, a read-only memory, a programmable read-only memory, or an electrically erasable programmable memory. The storage medium is located in the memory, and the processor reads information in the memory and completes the steps in the foregoing method in combination with hardware of the processor. To avoid repetition, details are not described herein again.

According to the method in the embodiments of this application, a communications system is further provided in an embodiment of this application, and the communications system includes the foregoing one or more network devices and one or more terminals or terminal devices.

It should further be understood that the numbers such as "first", "second", "third", and "fourth" included in this specification are merely for distinguishing purposes for ease of description, and are not intended to limit the scope of the embodiments of the present disclosure.

It should be understood that, in the embodiments of this application, sequence numbers of the foregoing processes do not mean execution sequences, while the execution sequences of the processes should be determined based on functions and internal logic of the processes without imposing any limitation on the implementation processes of the embodiments of the present disclosure.

A person of ordinary skill in the art may be aware that, the illustrative logical blocks and steps described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses or units, and may be implemented in electronic, optical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

All or some of the foregoing embodiments may be implemented by using software, hardware, or a combination thereof. When software is used to implement the embodiments, the embodiments may be implemented entirely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, through a coaxial cable, an optical fiber, or a twisted pair) or wireless (for example, through infrared, radio, or microwave) manner. The computer readable storage medium may be any medium that can be accessed by a computer, or may be a data storage device, such as a server or a data center, into which one or more media are integrated. The medium may be a magnetic medium (for example, a floppy disk, a hard disk, or a magnetic tape), an optical medium (for example, an optical disc), a semiconductor medium (for example, a solid state disk), or the like.

What is claimed is:

1. A device management method implemented by a first control device and comprising:
    obtaining, using Network Configuration Protocol (NETCONF) or Telnet, status indications of managed devices;
    storing, in a database, the status indications and original device identifiers of the managed devices, wherein the original device identifiers correspond to the status indications, and wherein the status indications and the original device identifiers are in a one-to-one correspondence;
    receiving, from a second control device and using Simple Network Management Protocol (SNMP), a request message comprising a first virtual device identifier identifying a first managed device and corresponding to a first original device identifier of the first management device;
    extracting, from the database in response to the request message, a first status indication of the first managed device;
    sending, to the second control device, using the SNMP, and upon automatic triggering when the first status indication is a preset status indication that is present on the managed device, the first status indication in an alarm message; and
    receiving, from the second control device and using the SNMP, a first configuration parameter corresponding to the first virtual device identifier.

2. The device management method of claim 1, further comprising:
    determining virtual device identifiers of the managed devices; and
    storing a correspondence between the original device identifiers and the virtual device identifiers.

3. The device management method of claim 2, further comprising sending, to the second control device and using the SNMP, the virtual device identifiers.

4. The device management method of claim 2, further comprising:
    storing the first configuration parameter and the first virtual device identifier in a correspondence in the database; and
    instructing, using the NETCONF or the Telnet, the first managed device to configure the first configuration parameter.

5. The device management method of claim 4, wherein the first configuration parameter instructs a shutdown of the first managed device.

6. The device management method of claim 1, wherein the first virtual device identifier comprises a combination of a first Internet Protocol (IP) address and a first transport layer port number corresponding to the first managed device.

7. The device management method of claim 1, wherein the first status indication is a central processing unit (CPU) or a memory usage rate of the first managed device.

8. A first control device comprising:
    a memory comprising instructions; and
    a processor coupled to the memory and configured to execute the instructions to:
        obtain, using Network Configuration Protocol (NETCONF) or Telnet, status indications of managed devices;
        store, in a database, the status indications and original device identifiers of the managed devices, wherein the original device identifiers correspond to the status indications, and wherein the status indications and the original device identifiers are in a one-to-one correspondence;
        receive, from a second control device and using Simple Network Management Protocol (SNMP), a request message comprising a first virtual device identifier identifying a first managed device and corresponding to a first original device identifier of the first management device;
        extract, from the database in response to the request message, a first status indication of the first managed device;
        send, to the second control device, using the SNMP, and upon automatic triggering when the first status indication is a preset status indication that is present on the managed device, the first status indication in an alarm message and independent of a polling round; and
        receive, from the second control device and using the SNMP, a first configuration parameter corresponding to the first virtual device identifier.

9. The first control device of claim 8, wherein the processor is further configured to:
    determine virtual device identifiers of the managed devices; and
    store a correspondence between the original device identifiers and the virtual device identifiers.

10. The first control device of claim 9, wherein the processor is further configured to send, to the second control device and using the SNMP, the virtual device identifiers.

11. The first control device of claim 9, wherein the processor is further configured to:
    store the first configuration parameter and the first virtual device identifier in a correspondence in the database; and
    instruct, using the NETCONF or the Telnet, the first managed device to configure the first configuration parameter.

12. The first control device of claim 11, wherein the first configuration parameter instructs a shutdown of the first managed device.

13. The first control device of claim 8, wherein the first virtual device identifier comprises a combination of a first Internet Protocol (IP) address and a first transport layer port number corresponding to the first managed device.

14. The first control device of claim 8, wherein the first status indication is a central processing unit (CPU) or a memory usage rate of the first managed device.

15. A computer program product comprising computer-executable instructions that are stored on a non-transitory medium and that, when executed by a processor, cause a first control device to:
    obtain, using Network Configuration Protocol (NETCONF) or Telnet, status indications of managed devices;
    store, in a database, the status indications and original device identifiers of the managed devices, wherein the original device identifiers correspond to the status indications, and wherein the status indications and the original device identifiers are in a one-to-one correspondence;
    receive, from a second control device and using Simple Network Management Protocol (SNMP), a request message comprising a first virtual device identifier identifying a first managed device and corresponding to a first original device identifier of the first management device;

extract, from the database, a first status indication of the first managed device;

send, to the second control device, using the SNMP, and upon automatic triggering when the first status indication is a preset status indication that is present on the managed device, the first status indication in an alarm message and independent of a polling round; and receive, from the second control device and using the SNMP, a first configuration parameter corresponding to the first virtual device identifier.

16. The computer program product of claim 15, wherein the instructions further cause the first control device to:

determine virtual device identifiers of the managed devices; and store a correspondence between the original device identifiers and the virtual device identifiers.

17. The computer program product of claim 16, wherein the instructions further cause the first control device to send, to the second control device and using the SNMP, the virtual device identifiers.

18. The computer program product of claim 16, wherein the instructions further cause the first control device to:

store the first configuration parameter and the first virtual device identifier in a correspondence in the database; and instruct, using NETCONF or the Telnet, the first managed device to configure the first configuration parameter.

19. The computer program product of claim 18, wherein the first configuration parameter instructs a shutdown of the first managed device.

20. The computer program product of claim 15, wherein the first virtual device identifier comprises a combination of a first Internet Protocol (IP) address and a first transport layer port number corresponding to the first managed device.

* * * * *